US006186599B1

United States Patent
Otomo et al.

(10) Patent No.: US 6,186,599 B1
(45) Date of Patent: Feb. 13, 2001

(54) ELECTRIC BRAKE APPARATUS HAVING A BRAKE MOTOR PREVENTED FROM BEING EXCESSIVELY MOVED IN A REVERSE DIRECTION

(75) Inventors: Akihiro Otomo, Toyota; Kenji Shirai, Mishima, both of (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/376,808

(22) Filed: Aug. 18, 1999

(30) Foreign Application Priority Data

Aug. 21, 1998 (JP) ................................................ 10-235930
Jan. 21, 1999 (JP) ................................................ 11-013420
Jun. 30, 1999 (JP) ................................................ 11-186484

(51) Int. Cl.[7] ............................ B60T 13/74; F16D 65/16
(52) U.S. Cl. .......................... 303/20; 188/158; 188/162; 188/72.1
(58) Field of Search ................................ 303/20, 115.2, 303/162, 3, 112, 155, 152; 188/72.1, 72.8, 156, 162, 158, 181 T, 1.11 ALL; 318/14, 563, 646

(56) References Cited

U.S. PATENT DOCUMENTS 4,804,073 * 2/1989 Taig et al. ............................ 188/72.1
5,366,280 * 11/1994 Littlejphn ............................ 303/20
5,931,268 * 8/1999 Kingston et al. .................... 188/162
5,957,246 * 9/1999 Suzuki .................................. 303/20
6,040,665 * 3/2000 Shirai et al. ......................... 318/14

FOREIGN PATENT DOCUMENTS

0982210 * 3/2000 (EP) .
3-500918 2/1991 (JP) .
7-291120 11/1995 (JP) .
8910496 * 11/1989 (WO) .

* cited by examiner

Primary Examiner—Douglas C. Butler
(74) Attorney, Agent, or Firm—Kenyon & Kenyon

(57) ABSTRACT

An electric brake apparatus can positively prevent a brake motor from being excessively rotated in a reverse direction in which a braking force is cancelled. A determination is made as to whether or not the brake motor is excessively driven in the reverse direction. An operation of the brake motor is stopped when the brake motor is determined to be excessively driven in the reverse direction. Accordingly, a member of the electric brake apparatus moved by the brake motor is prevented from being excessively moved beyond a predetermined position. Thus, a part of the electric brake apparatus is prevented from being damaged due to an excessive movement of the member moved by the brake motor.

7 Claims, 8 Drawing Sheets

ELECTRIC BRAKE APPARATUS HAVING A BRAKE MOTOR PREVENTED FROM BEING EXCESSIVELY MOVED IN A REVERSE DIRECTION

BACKGROUND OF THE INVENTION

1. Field of the Invention

The present invention relates to a brake apparatus and, more particularly, to an electric brake apparatus having a brake motor which is rotated in a normal direction so as to generate a braking force and rotated in a reverse direction so as to cancel the braking force.

2. Description of the Related Art

Japanese Laid-Open Patent Application No.7-291120 discloses an electric brake apparatus having a disc brake which includes an electrically driven caliper and a disc rotor rotating with a wheel. The electrically driven caliper is driven by a brake motor so as to generate a clamping force. When a power supply to the brake motor is stopped, the clamping force of the electrically driven caliper is cancelled. More specifically, the brake motor moves brake pads provided on the electrically driven caliper toward the disc rotor so that a braking force is generated by the brake pads being pressed against the disc rotor. In order to cancel the braking force, the brake motor moves the brake pads in a direction opposite to the direction toward the disc rotor. Hereinafter, the rotation of the brake motor in the direction to generate the braking force is referred to as a normal rotation, and the direction of the normal rotation is referred to as a normal direction. Additionally, the rotation of the brake motor in a direction to cancel the braking force is referred to as a reverse rotation, and the direction of the reverse rotation is referred to as a reverse direction.

When the brake motor is rotated in the reverse direction, there may be a case in which the brake motor is driven by an excessive power. In such a case, parts provided around a motor shaft of the brake motor may be damaged due to excessive rotation. Additionally, a clearance gap between the disc rotor and the brake pads is increased, which increases a response time of a subsequent braking operation. Accordingly, in order to prevent the parts from being damaged and maintain a quick response of a braking operation, it is necessary to appropriately prevent the brake motor from being excessively rotated in the reverse direction.

In the conventional brake apparatus, a mechanical clutch is provided so as to disengage the brake motor from the caliper when an excessive power is generated by the brake motor in the reverse direction so that the excessive power is not transmitted to the caliper. However, there is a problem in that the entire structure of the electric brake apparatus is complex due to addition of the mechanical clutch.

SUMMARY OF THE INVENTION

It is a general object of the present invention to provide an improved and useful electric brake apparatus in which the above-mentioned problem is eliminated.

A more specific object of the present invention is to provide an electric brake apparatus which can positively prevent a brake motor from being excessively rotated in a reverse direction in which a braking force is cancelled.

In order to achieve the above-mentioned object, there is provided according to the present invention an electric brake apparatus for generating a braking force by driving a brake motor in a predetermined direction, the braking force being canceled by driving the brake motor in a reverse direction opposite to the predetermined direction, said electric brake apparatus comprising:

excessive rotation determining means for determining whether or not the brake motor is excessively driven in the reverse direction; and motor stopping means for stopping an operation of the brake motor when the brake motor is determined to be excessively driven in the reverse direction.

According to the above-mentioned invention, since the brake motor is stopped when it is determined that the brake motor is excessively driven in the reverse direction, a member of the electric brake apparatus moved by the brake motor is prevented from being excessively moved beyond a predetermined position. Accordingly, a part of the electric brake apparatus is prevented from being damaged due to an excessive movement of the member moved by the brake motor with a simple structure as compared to a mechanical structure.

In the above-mentioned invention, the excessive rotation determining means may include a rotation sensor detecting a rotational angle of a rotational shaft of said brake motor so that the excessive rotation determining means determines that the brake motor is excessively rotated when the rotational shaft is rotated beyond a predetermined angle in the reverse direction.

Additionally, in the electric brake apparatus according to the present invention, the motor stopping means may include a fuse which blows when a current exceeding a predetermined current flows to said brake motor in a direction in which said brake motor is driven in the reverse direction.

Further, in the electric brake apparatus according to the present invention, the excessive rotation determining means may include a current detecting circuit detecting a current flowing to the brake motor in a direction in which the brake motor is driven in the reverse direction, and the motor stopping means may stop the operation of the brake motor when the current detected by the current detecting circuit exceeds a predetermined value.

According to this invention, when the current flowing to the brake motor in the reverse direction exceeds the predetermined value, the brake motor is stopped. When the operation of the brake motor in the reverse direction is not restricted, a small current flows to the brake motor. However, if the operation of the brake motor is restricted for some reason, a large load is applied to the brake motor which results in an increase in the current flowing to the brake motor. Accordingly, if the current flowing to the brake motor exceeds a predetermined value when the brake motor is driven in the reverse direction, it can be determined that the brake motor is excessively driven in the reverse direction. In the present invention, the brake motor is stopped when the current flowing to the brake motor in the reverse direction exceeds the predetermined value. Thus, a part of the electric brake apparatus is prevented from being damaged due to an excessive movement of a member moved by the brake motor with a simple structure as compared to a mechanical structure.

The electric brake apparatus according to the present invention may further comprise a reciprocal member reciprocally movable by operation of the brake motor so as to press a brake pad against a brake disc rotating with a wheel, wherein the excessive rotation determining means may calculate a travel of said reciprocal member based on a rotational angle of a rotational shaft of the brake motor so that the excessive rotation determining means determines that the brake motor is excessively rotated when the reciprocal member travels beyond a predetermined position in a direction in which the brake motor is driven in the reverse direction.

The above-mentioned electric brake apparatus may further comprise an excessive reverse-rotation switch which turns on when the reciprocal member reaches the predetermined position, wherein the motor stopping means stops the operation of the brake motor when the excessive reverse-rotation switch is turned on.

Additionally, the electric brake apparatus according to the above-mentioned invention may further comprise means for determining whether or not the brake motor is driven in the reverse direction for a continuous period longer than a predetermined period after the brake pad is separated from the brake disc, wherein the motor stopping means may stop the operation of the brake motor when the brake motor is driven in the reverse direction for the continuous period longer than the predetermined period.

Other objects, features and advantages of the present invention will become more apparent from the following detailed description when read in conjunction with the accompanying drawings.

DETAILED DESCRIPTION OF THE PREFERRED EMBODIMENTS

A description will now be given of a first embodiment of the present invention.

Figure 1:
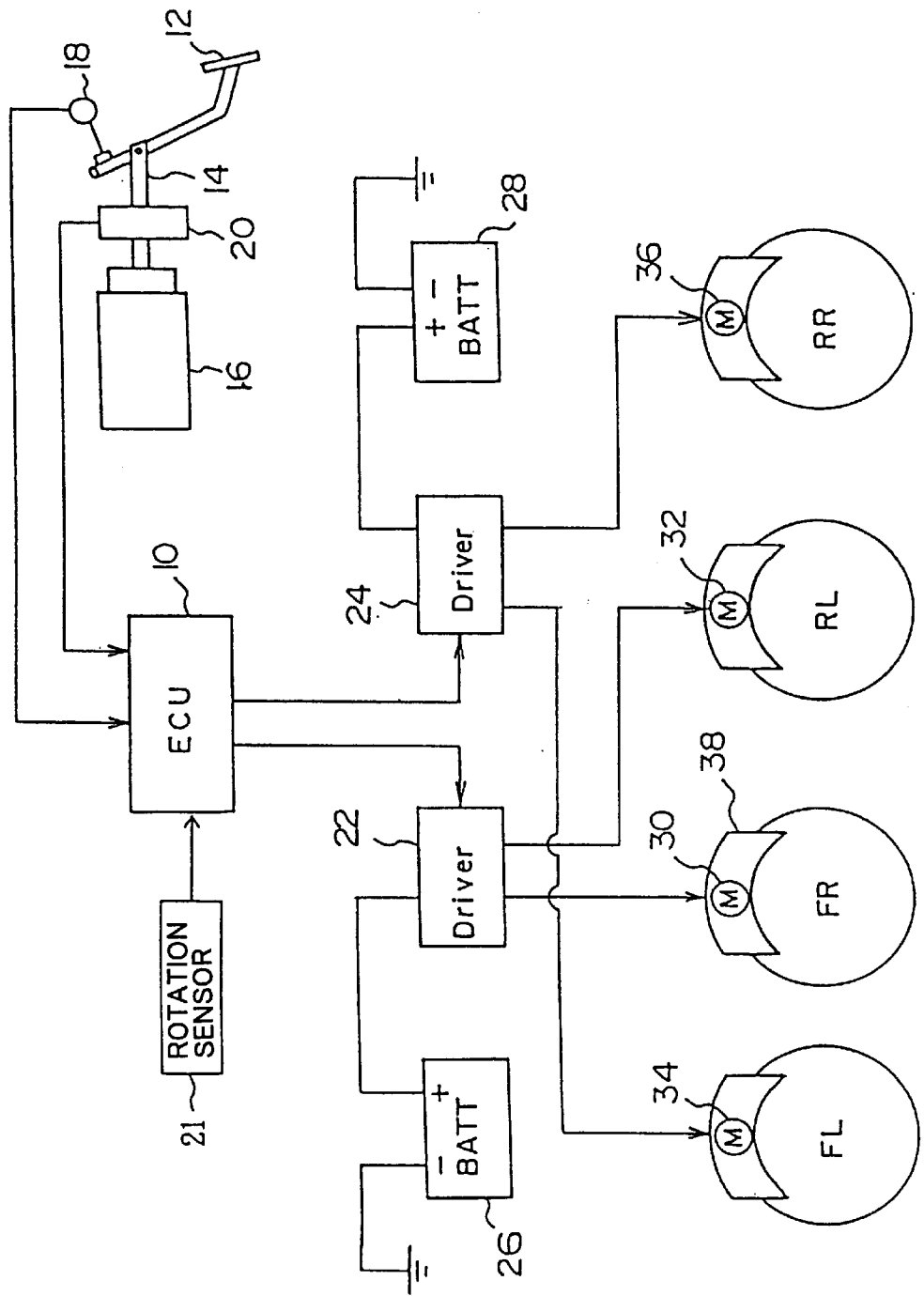
FIG. 1 is a system structure diagram of an electric brake apparatus according to a first embodiment of the present invention.

FIG. 1 is a system structure diagram of an electric brake apparatus according to the first embodiment of the present invention. The electric brake apparatus according to the present embodiment is provided with an electronic control unit (hereinafter referred to as ECU) 10. The electric brake apparatus according to the present embodiment generates a braking force corresponding to a degree of a braking operation by being controlled by the ECU 10.

The electric brake apparatus according to the present embodiment includes a brake pedal 12. The brake pedal 12 is connected to a stroke simulator 16 via an operational shaft 14. When the brake pedal 12 is pressed by a driver, the operational shaft 14 protrudes into the stroke simulator 16. The stroke simulator 16 generates a reaction force corresponding to an amount of entry of the operational shaft 14. Accordingly, a reaction force corresponding to the pedal stroke is generated in the brake pedal 12.

A pedal switch 18 is provided in the vicinity of the brake pedal 12. The pedal switch 18 maintains an OFF-state when the brake pedal 12 is not being pressed, and outputs an ON signal when the brake pedal 12 is being pressed. The output signal of the pedal switch 18 is supplied to the ECU 10. The ECU 10 determines whether or not a braking operation is being performed in accordance with the output signal of the pedal switch 18.

A stroke sensor 20 is provided to the operational shaft 14. The stroke sensor 20 outputs an electric signal corresponding to a pedal stroke. The output signal of the stroke sensor 20 is supplied to the ECU 10. The ECU 10 detects the pedal stroke based on the output signal of the stroke sensor 20.

A plurality of rotation sensors 21, each of which is provided on a periphery of a motor shaft of a respective one of brake motors described later, are connected to the ECU 10. Each of the rotation sensors 21 outputs an electric signal corresponding to an intensity of a magnetic flux generated by a magnet. The ECU 10 detects a rotational angle of the motor shaft of each of the brake motors in accordance with the output signal of each of the rotation sensors 21.

Drivers 22 and 24 are connected to the ECU 10. The drivers 22 and 24 are connected to a positive terminal of a first battery 26 and a positive terminal of a second battery 28, respectively. Additionally, the driver 22 is connected to a brake motor 30 provided to a front right wheel FR and a brake motor 32 provided to a rear left wheel RL. The driver 24 is connected to a brake motor 34 provided to a front left wheel FL and a brake motor 36 provided to a rear right wheel RR.

The drivers 22 and 24 drive the brake motors 30 to 36 by using the first battery 26 or the second battery 28 as an electric power source. The drivers 22 and 24 control each of the brake motors 30 to 36 independently in accordance with instruction signals supplied by the ECU 10. The front left and right wheels FL and FR and the rear left and right wheels RL and RR are provided with disc brakes driven by the respective brake motors 30 to 36. Each of the disc brakes generates a brake force corresponding to an operational state of the respective one of the brake motors 30 to 36.

Figure 2:
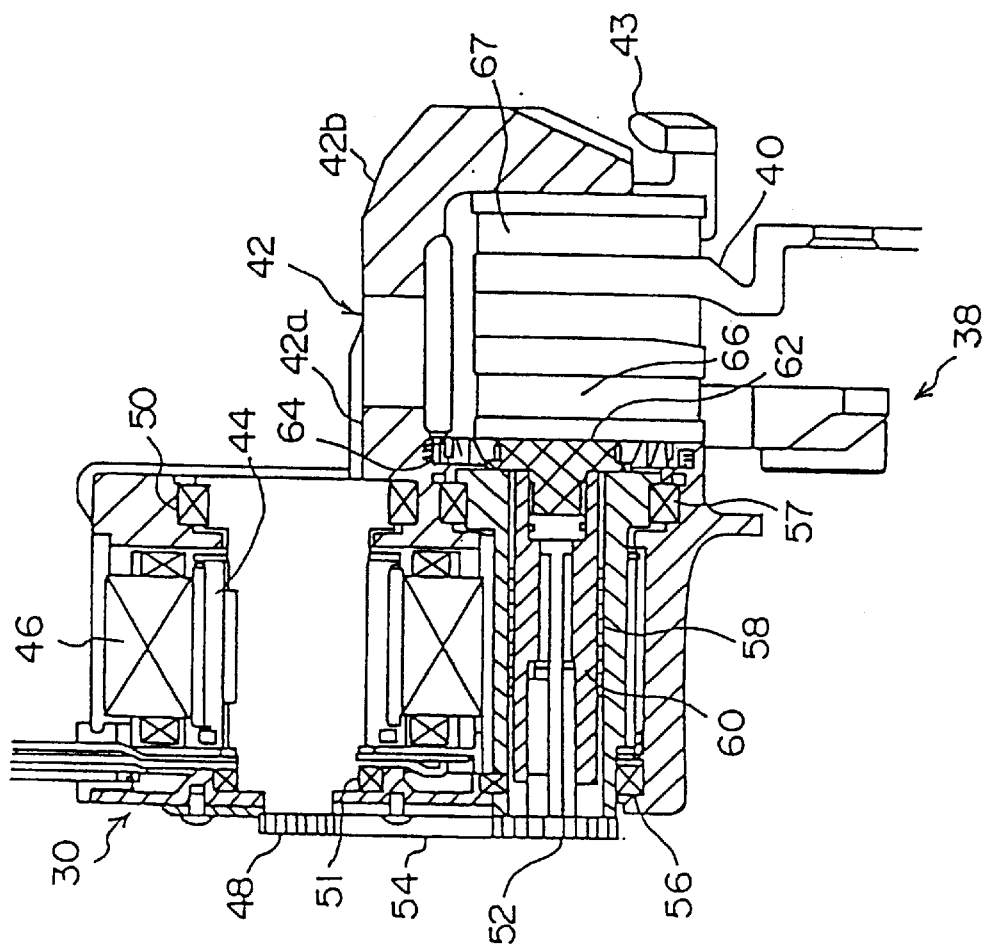
FIG. 2 is a cross-sectional view of the electric brake apparatus according to the first embodiment of the present invention.

FIG. 2 is a cross-sectional view of one of the disc brakes provided in the electric brake apparatus according to the present invention. It should be noted that FIG. 2 shows a structure of the disc brake 38 provided to the front right wheel FR. The disc brakes provided in the electric brake apparatus according to the present invention do not differ from each other in their structure and operation. Accordingly, a description will be given of a structure and an operation of only the disc brake 38 provided to the front right wheel FR as a representative disc brake.

The disc brake 38 according to the present embodiment comprises a disc rotor 40 which rotates with the front right wheel FR and a caliper 42 provided on a periphery of the disc rotor 40. The caliper 42 is supported by a mounting bracket 43 fixed to a vehicle body so that the caliper 42 is movable in a direction along the rotational axis of the disc rotor 40.

The above-mentioned brake motor 30 is fixed to the caliper 42. The brake motor 30 is a DC motor having a rotor 44 constituted by a magnet and a stator 46 constituted by a coil. The rotor 44 of the brake motor 30 is prevented from being rotated due to a frictional force exerted thereon. Additionally, when a motor current is being supplied to the stator 46, the brake motor 30 generates a torque corresponding to the motor current.

A motor shaft 48 of the brake motor 30 is a hollow rod-like member, and is rotatably supported by the caliper 42 via thrust bearings 50 and 51. The motor shaft 48 of the brake motor 30 is rotated with respect to the caliper 42 by a magnetic field which is generated by a current supplied to the stator 46.

A rotor having a plurality of teeth at predetermined intervals is formed on a periphery of the motor shaft 48. Additionally, the above-mentioned rotational sensor 21 comprising a Hall element is mounted on the periphery of the motor shaft 48. Further, a magnet is provided above the rotation sensor 21. The rotation sensor 21 and the magnet are fixed to the caliper 42. Magnetic fluxes generated by the magnet pass through the rotation sensor 21 via an air gap formed between the magnet and the rotation sensor 21.

The density of the magnetic flux passing through the rotation sensor 21 is high when the rotation sensor 21 faces one of the teeth of the rotor, and is low when the rotation sensor 21 does not face one of the teeth. Accordingly, the rotation sensor 21 detects a high magnetic flux density each time the motor shaft 48 rotates a predetermined angle. The rotation sensor outputs an electric signal corresponding to the density of the magnetic flux. The output signal of the rotation sensor 21 is supplied to the ECU 10. The ECU 10 detects a rotational angle $\theta$ of the motor shaft 48 in accordance with the output signal of the rotation sensor 21.

The caliper 42 is provided with an operational shaft 52. The operational shaft 52 is rotatably supported by the caliper 42 via thrust bearings 56 and 57. The operational shaft 52 is connected to the motor shaft 48 of the brake motor 30 via a belt 54. The operational shaft 52 rotates in association with rotation of the motor shaft 48 at a predetermined ratio. An output rod 60 is engaged with a threaded part of an inner wall of the operational shaft 52 via a roller screw 58. The output rod 60 is supported by a member formed on the caliper 42 so that the output rod 60 does not rotate but is movable in an axial direction (longitudinal direction) thereof. Accordingly, the output rod 60 is permitted to move in the axial direction in association with rotation of the operational shaft 52. According to the above-mentioned structure, rotation of the motor shaft 48 of the brake motor 30 is converted into thrust movement of the output rod 60 in the axial direction. It should be noted that the ECU 10 can convert the rotational angle $\theta$ of the motor shaft 48 into a piston stroke S of the output rod 60 in the axial direction.

The caliper 42 is provided with a pressing member 62 having a rod part and a flange part. The flange part of the pressing member 62 is mounted on the caliper 42 via a seal member 64 made of an elastic material. The pressing member 62 is permitted to move in the axial direction with respect to the caliper 42 by the seal member 64. The rod part of the pressing member 62 is engaged with the output rod 60. The pressing member 62 moves in the right direction in FIG. 2 when the flange part is pressed by an end of the output rod 60. A brake pad 66 is fixed to the pressing member 62 so that the brake pad 66 faces a surface of the disc rotor 40.

Additionally, a reaction part 42b is formed on the caliper 42. The reaction part 42b moves in the leftward direction due to a reaction force when the brake pad 66 is pressed against the disc rotor 40. A brake pad 67 is fixed to the reaction part 42b so that the brake pad 67 faces a surface of the disc rotor 40.

In the disc brake 38 according to the present embodiment, when the brake motor is not being operated, a predetermined clearance gap is maintained between the disc rotor 40 and each of the brake pads 66 and 67. Under such a condition, when the motor shaft 48 of the brake motor 30 is rotated, the operational shaft is rotated. When the operational shaft 52 is rotated, the output rod 60 moves in the axial direction.

When the output rod 60 moves a distance corresponding to the above-mentioned predetermined clearance gap in the rightward direction in FIG. 2, the brake pad 66 fixed on the pressing member 62 contacts the left-side surface of the disc rotor 40 in FIG. 2. When the brake pad 66 contacts the disc rotor 40, the brake pad 67 fixed on the reaction part 42b moves toward the disc rotor 40 due to a reaction force and finally contacts the disc rotor 40. If the output rod 60 is moved further in the rightward direction in FIG. 2, the brake pads 66 and 67 are pressed against the disc rotor 40 with a large pressing force.

In the above-mentioned disc brake 38, the caliper 42 presses the brake pads 66 and 67 by using the brake motor 30 as a power source. Thus, according to the above-mentioned disc brake 38, a brake force corresponding to an operational state of the brake motor 30 can be generated. Hereinafter, a direction of rotation of the motor shaft 48 when the brake pads 66 and 67 are moved toward the disc rotor 40 is referred to as a normal direction.

On the other hand, when the output rod 60 moves in the leftward direction in FIG. 2 under the condition in which the brake pads 66 and 67 are pressed against the disc rotor 40, the brake pad 66 fixed on the pressing member 62 and the brake pad 67 fixed on the reaction part 42b are separated from the disc rotor 40. Thus, according to the above-mentioned disc brake 38, a brake force of a vehicle can be canceled in accordance with an operational state of the brake motor 30. Hereinafter, the direction of rotation of the motor shaft 48 to separate the brake pads 66 and 67 from the disc rotor 40 is referred to as a reverse direction.

In order to separate the brake pads 66 and 67 from the disc rotor 40, the brake motor is driven so that the predetermined clearance gap is maintained between the disc rotor 40 and each of the brake pads 66 and 67. However, there may be a case in which the motor shaft 48 of the brake motor 30 excessively rotates due to malfunction of the rotation sensor 21 such that the distance between the disc rotor 40 and each of the brake pads 66 and 67 exceeds the predetermined clearance gap. In such a case, a part located in the axial direction of the output rod 60 may be damaged due to excessive movement of the output rod 60. Additionally, the clearance gap between the disc rotor 40 and each of the brake pads is increased, which increases a response time of a subsequent braking operation. Accordingly, in order to prevent the part from being damaged and maintain a quick response of a braking operation, it is necessary to positively prevent the brake motor 30 from being excessively rotated in the reverse direction.

The electric brake apparatus according to the present embodiment has a feature in that the brake motor 30 is prevented from being excessively rotated in the reverse direction.

Figure 3:
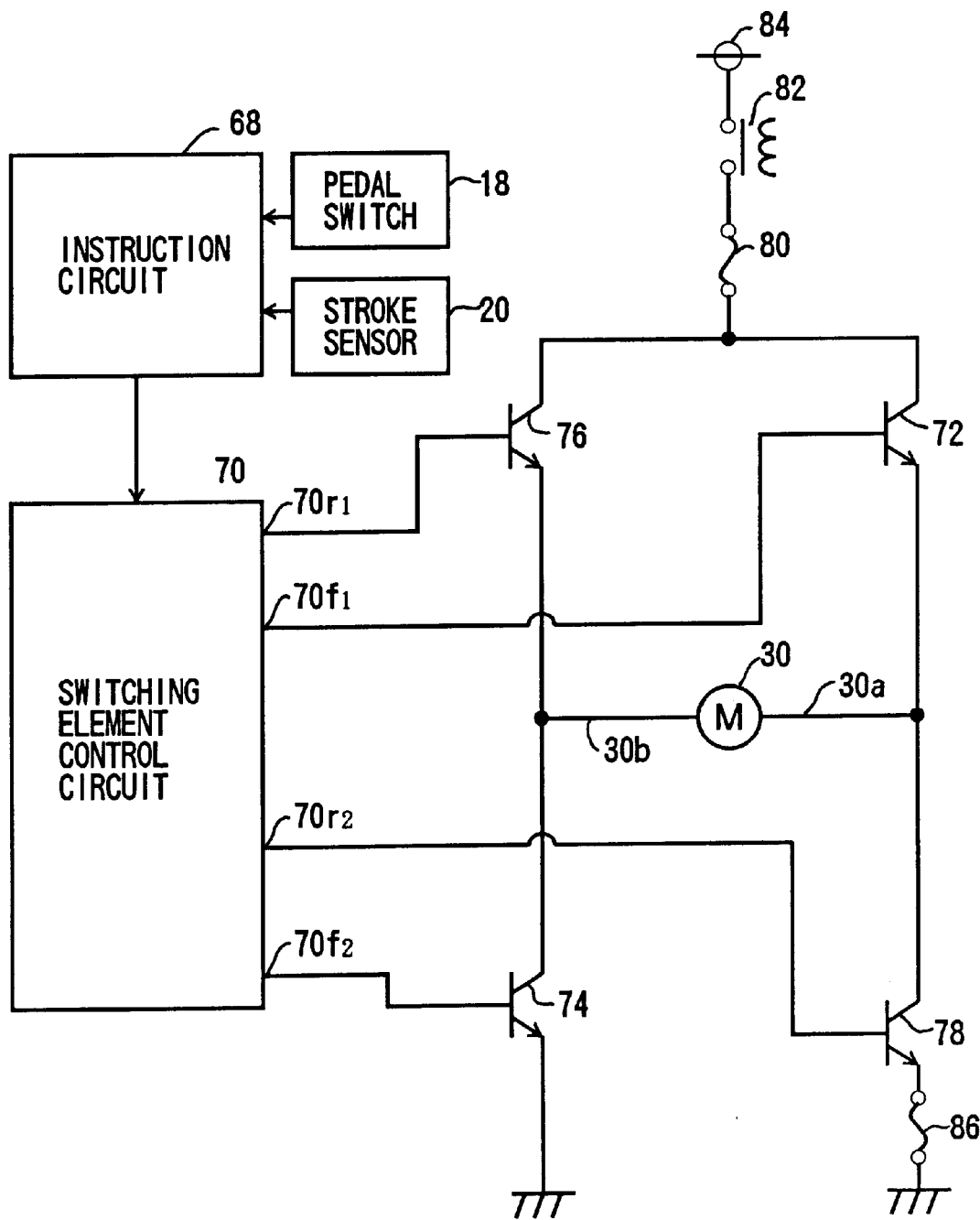
FIG. 3 is a circuit diagram of a control circuit connected to a brake motor provided in the electric brake apparatus according to the first embodiment of the present invention.

FIG. 3 is a circuit diagram of a control circuit connected to the brake motor 30 provided in the electric brake apparatus according to the present embodiment.

The ECU 10 according to the present embodiment includes an instruction circuit 68. The instruction circuit 68 calculates an instruction current to be supplied to the brake motor 30 in accordance with the output signal of the pedal switch 18 and the output signal of the stroke sensor 20. The instruction circuit 68 is connected to a switching element control circuit 70 provided in the driver 22. The instruction circuit 68 calculates and generates an instruction signal and supplied the instruction signal to the switching element control circuit 70.

The switching element control circuit 70 has normal direction output terminals 70f1 and 70f2 and reverse direction output terminals 70r1 and 70r2. The normal direction output terminal 70f1 is connected to a base terminal of a switching element 72, and the normal direction output terminal 70f2 is connected to a base terminal of a switching element 74. The reverse direction output terminal 70r1 is connected to a base terminal of a switching element 76, and the reverse direction output terminal 70r2 is connected to a base terminal of a switching element 78. Each of the switching elements 72, 74, 76 and 78 is constituted by an NPN transistor.

The switching element control circuit 70 turns on the normal direction switching elements 72 and 74 when the output signal of the pedal switch 18 is an ON state, and turns on the reverse direction switching elements 76 and 78 when the output signal of the pedal switch 18 is an OFF state. It should be noted that the normal direction switching elements 72 and 74 and the reverse direction switching elements 76 and 78 are not turned on simultaneously.

An emitter terminal of the normal direction switching element 72 and a collector terminal of the reverse direction switching element 78 are connected to a current input terminal 30a of the brake motor 30. On the other hand, a collector terminal of the normal direction switching element 74 and an emitter terminal of the reverse direction switching element 76 are connected to a current output terminal 30b of the brake motor 30.

Additionally, a collector terminal of the normal direction switching element 72 and a collector terminal of the reverse direction switching element 76 are connected to a power supply terminal 84 via a main fuse 80 and a main relay 82. The main fuse 80 interrupts connection between the power supply terminal 84 and the control circuit when a large current flows in the control circuit. Additionally, the main relay 82 is turned on and off in accordance with a state of a main power of the vehicle.

Further, an emitter terminal of the normal direction switching element 74 is grounded, and the emitter terminal of the reverse direction switching terminal 78 is grounded via a sub-fuse 86. The sub-fuse 86 is blown when a large current flows to the emitter terminal of the reverse direction switching element 78 so as to open a connection between the emitter terminal and the ground. The current which blows the sub-fuse 86 is set to be equal to a maximum value of a current for separating the brake pads 66 and 67 from the disc rotor 40.

According to the above-mentioned structure, when the normal direction switching elements 72 and 74 are turned on, a current flows from the current input terminal 30a to the current output terminal 30b of the brake motor 30. Hereinafter, the current flowing from the current input terminal 30a to the current output terminal 30b is referred to as a normal current. In this case, the motor shaft 48 of the brake motor 30 is rotated in the normal direction so that the output rod 60 moves in the rightward direction in FIG. 2. Thus, according to the present embodiment, a braking operation can be performed by providing the normal current to the brake motor 30.

Additionally, according to the above-mentioned structure, when the reverse direction switching elements 76 and 78 are turned on, a current flows from the current output terminal 30b to the current input terminal 30a of the brake motor 30. Hereinafter, the current flowing from the current output terminal 30b to the current input terminal 30a is referred to as a reverse current. In this case, the motor shaft 48 of the brake motor 30 is rotated in the reverse direction so that the output rod 60 moves in the leftward direction in FIG. 2. Thus, according to the present embodiment, a braking operation can be canceled by providing the reverse current to the brake motor 30.

According to the present embodiment, when a braking operation is canceled, the output rod 60 does not contact any parts. In this case, after the brake pads 66 and 67 separate from the disc rotor 40, a large torque is not generated by the brake motor 30. However, if the output rod 60 excessively moves in the reverse direction, the output rod 60 may contact a part located in the vicinity of the output rod 60. In such a case, a load is applied to the brake motor 30 which results in a large torque being generated in the brake motor 30. When the large torque is generated by the brake motor 30, the reverse current flowing in the brake motor 30 is increased.

In the present embodiment, as mentioned above, an end of the sub-fuse 86 is connected to the emitter terminal of the reverse direction switching element 78. An opposite end of the sub-fuse 86 is grounded. The sub-fuse 86 blows when the reverse current reaches a predetermined value so that a voltage is not provided to the brake motor 30. Thus, according to the present embodiment, when the reverse current exceeding the predetermined value flows in the driver 22 which drives the brake motor 30, the reverse rotation of the brake motor 30 can be stopped. Thus, according to the present embodiment, the brake motor 30 is prevented from being excessively rotated in the reverse direction.

If the brake motor 30 does not excessively rotate in the reverse direction, the output rod 60 moves within a predetermined range, and the clearance gap between the disc rotor 40 and each of the brake pads 66 and 67 is maintained at a predetermined distance. Thus, according to the electric brake apparatus of the present embodiment, a damage of parts can be prevented and a quick response of a braking operation can be achieved. Thereby, the electric brake apparatus according to the present invention can achieve the above-mentioned function with a simple structure as compared to the mechanical structure of the conventional electric brake apparatus.

Additionally, in the present embodiment, the brake motor 30 is not positioned along the axis of the output rod 60 which presses the brake pads 66 and 67 toward the disc rotor 40. That is, the output rod 60 and the motor shaft 48 of the brake motor 30 are not connected to each other along the same axis. Thus, according to the arrangement of the brake motor 30 and the output rod 60, the brake motor 30 can be prevented from being damaged due to an excessive displacement of the output rod 60.

A description will now be given, with reference to FIGS. 4 and 5, of a second embodiment of the present embodiment.

Figure 4:
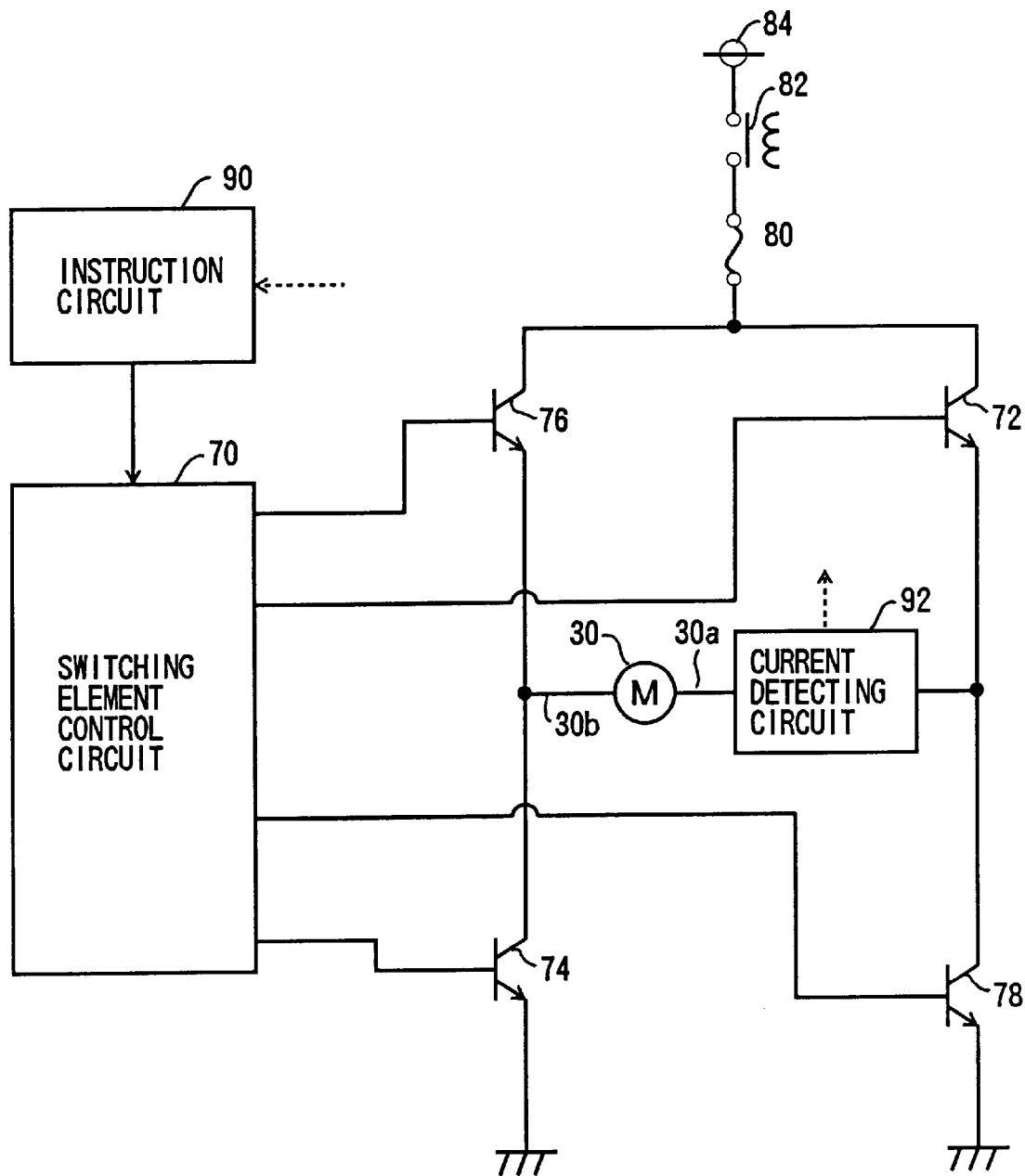
FIG. 4 is a circuit diagram of a control circuit connected to a brake motor provided in an electric brake apparatus according to a second embodiment of the present invention.

FIG. 4 is a circuit diagram of the control circuit connected to the brake motor 30 provided in the electric brake apparatus according to the present invention. In FIG. 4, parts that are the same as the parts shown in FIG. 3 are given the same reference numerals, and descriptions thereof will be omitted.

The ECU 10 according to the present embodiment is provided with an instruction circuit 90. The instruction circuit 90 calculates an instruction current to be supplied to the brake motor 30 in accordance with the output signal of the pedal switch 18 and the output signal of the stroke sensor 20. The instruction circuit 90 is connected to the switching element control circuit 70 formed in the driver 22. The instruction circuit 90 supplies the calculated instruction signal to the switching element control circuit 70.

The emitter terminal of the normal direction switching element 72 and the collector terminal of the reverse direction switching element 78 are connected to the current input terminal 30a of the brake motor 30 via a current detecting circuit 92. The current detecting circuit 92 outputs an electric signal corresponding to a current actually flowing through the brake motor 30. An output signal of the current detecting circuit 92 is supplied to the instruction circuit 90. The instruction circuit 90 determines whether to supply a current to the brake motor 30 based on the output signal.

Figure 5:
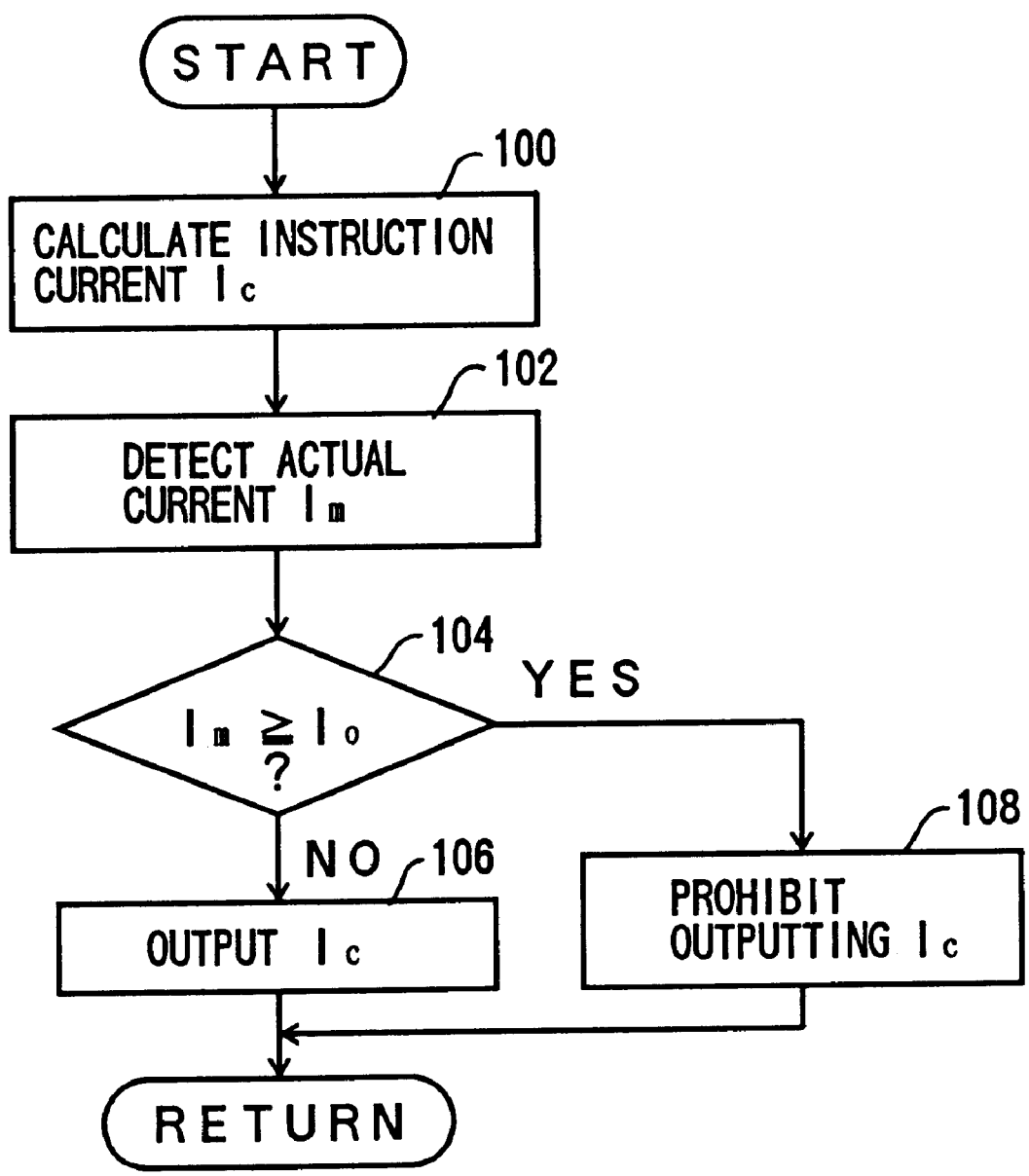
FIG. 5 is a flowchart of a control routine performed by the electric brake apparatus according to the second embodiment of the present invention.

FIG. 5 is a flowchart of a control routine performed by the ECU 10 provided in the electric bake apparatus according to the present embodiment. The control routine shown in FIG. 5 is started each time the routine is ended. When the control routine shown in FIG. 5 is started, the process of step 100 is performed first.

In step 100, the instruction current Ic to be supplied to the brake motor 30 is calculated based on the output signal of the pedal switch 18 and the output signal of the stroke sensor 20.

In step 102, an actual current Im actually flowing in the brake motor 30 is detected based on the output signal of the current detecting circuit 92.

In step 104, it is determined whether or not the actual current Im detected in step 102 is the reverse current which is equal to or greater than a predetermined value I0. The predetermined value I0 is a maximum reverse current which is permitted to be supplied to the brake motor 30 so that the output rod 60 is prevented from being excessively separated from the disc rotor 40, that is, the brake motor 30 is not excessively rotated in the reverse direction.

Accordingly, if it is determined that Im≧I0 is not established, it can be determined that a current which excessively rotates the brake motor 30 in the reverse direction is not supplied. Thus, in such a case, the process of step 106 is performed. On the other hand, if it is determined that Im≧I0 is established, it can be determined that a current which excessively rotates the brake motor 30 in the reverse direction is being supplied. Thus, in such a case, the process of step 108 is performed.

In step 106, an instruction signal is output to the switching element control circuit 70 so that the instruction current Ic calculated in the above-mentioned step 100 flows in the brake motor 30.

In step 108, the instruction signal is prohibited from being output to the switching element control circuit 70 so that the instruction current Ic calculated in the above-mentioned step 100 does not flow in the brake motor 30.

According to the above-mentioned process, when an actual current actually flowing in the brake motor 30 is a reverse current having a predetermined value, the current being supplied to the brake motor 30 can be stopped. Thus, according to the present embodiment, when a reverse current having the predetermined value flows in the driver 22 which drives the brake motor 30, the reverse rotation of the brake motor 30 can be stopped. Thus, according to the electric brake apparatus of the present embodiment, since the brake motor 30 is prevented from being excessively rotated in the reverse direction, damage of a part is prevented and a quick response of a braking operation can be achieved. Thereby, the electric brake apparatus according to the present embodiment can achieve the above-mentioned function with a simple structure as compared to the mechanical structure.

Figure 6:
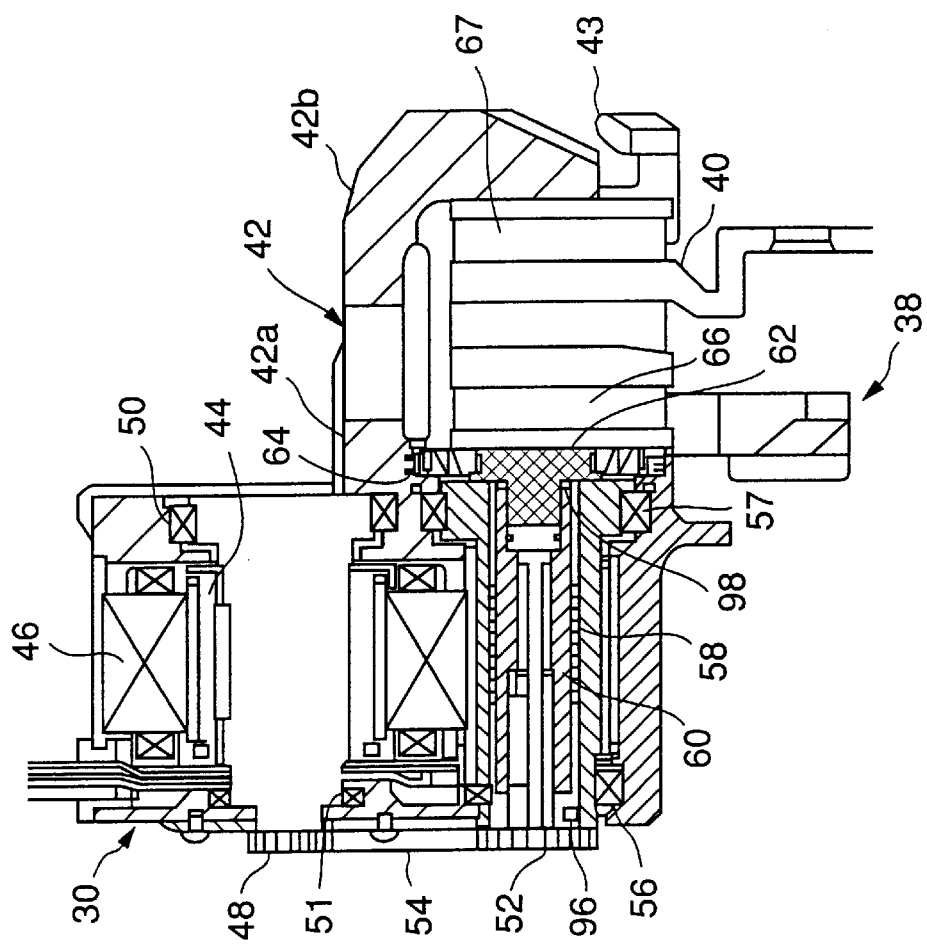
FIG. 6 is a cross-sectional view of an electric brake apparatus according to a third embodiment of the present invention.
Figure 7:
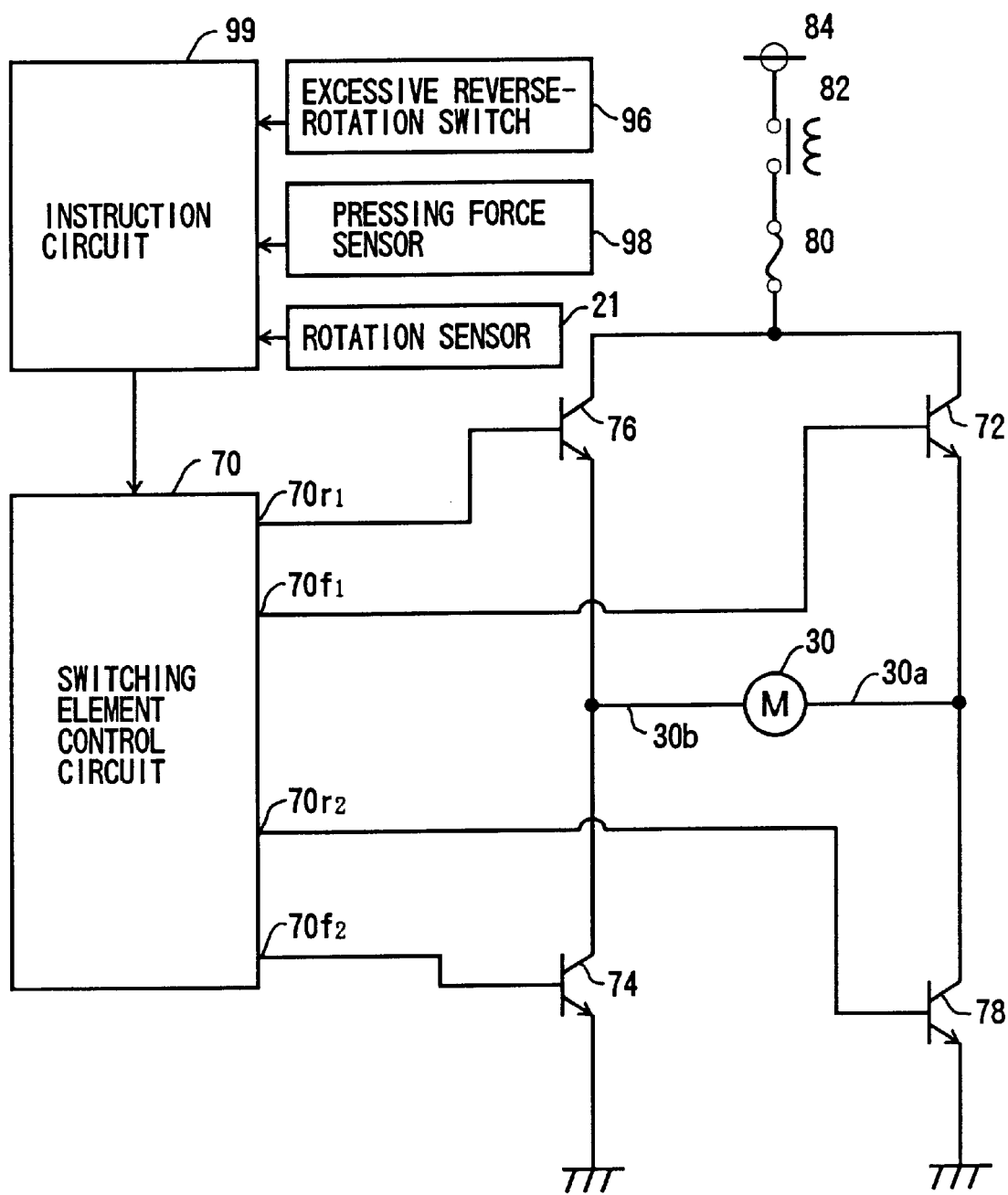
FIG. 7 is a circuit diagram of a control circuit connected to a brake motor provided in the electric brake apparatus according to the third embodiment of the present invention.

A description will now be given, with reference to FIG. 6 through FIG. 8, of a third embodiment of the present invention. An electric brake apparatus according to the third embodiment of the present invention can be achieved by having the ECU 10 perform a process shown in FIG. 6 so as to prevent the brake motor 30 from being excessively rotated in the reverse direction. In FIGS. 6 and 7, parts that are the same as the parts shown in FIGS. 2 and 3 are given the same reference numerals, and descriptions thereof will be omitted.

In the present embodiment, an excessive reverse-rotation switch 96 is provided in the vicinity of the left-end portion of the output rod 60 in FIG. 2. The excessive reverse-rotation switch 96 normally maintains an off-state, and outputs an on-signal when an excessive movement of the output rod 60 due to an excessive reverse rotation of the brake motor 30 is detected. The output signal of the excessive reverse-rotation switch 96 is supplied to the ECU 10. The ECU 10 determines whether or not the brake motor 30 is excessively rotating in the reverse direction based on the output signal of the excessive reverse-rotation switch 96. It should be noted that a micro limit switch or a capacitor sensor can be used as the excessive reverse-rotation switch 96.

Additionally, a pressing force sensor 98 is provided between the output rod 60 and the pressing member 62. The pressing force sensor 98 outputs a signal corresponding to a pressing force generated between the output rod 60 and the pressing member 62. Specifically, the pressing force sensor 98 outputs a signal indicating a low pressing force when the output rod 60 and the pressing member 62 do not contact each other, that is, when the brake pads 66 and 67 are not pressed against the disc rotor 40. On the other hand, when the output rod 60 and the pressing member 62 contact each other, that is, when the brake pads 66 and 67 are pressed against the disc rotor 40 so as to generate a braking force, the pressing force sensor 98 outputs a signal indicating a high pressing force corresponding to the pressing force of the brake pads 66 and 67 against the disc rotor 40. The output signal of the pressing force sensor 98 is supplied to the ECU 10. The ECU 10 detects the pressing force P generated between the output rod 60 and the pressing member 62 based on the output signal of the pressing force sensor 98.

FIG. 7 is a circuit diagram of a control circuit connected to a brake motor 30 provided in the electric brake apparatus according to the present embodiment.

The ECU 10 of the present embodiment is provide with an instruction circuit 99. The instruction circuit 99 calculates an instruction current to be supplied to the brake motor 30 in accordance with the output signal of the excessive reverse-rotation switch 96 and the output signal of the pressing force sensor 98. The instruction circuit is connected to the switching element control circuit 70 formed in the driver 22. The instruction circuit supplies a calculated instruction signal to the switching element control circuit 70.

The electric brake apparatus according to the present embodiment has a feature that the brake motor 30 is positively prevented from being excessively rotated in the reverse direction when a malfunction occurs in one of the rotation sensor 21, the excessive reverse-rotation switch 96 and the pressing force sensor 98. A description will now be given of the feature of the present embodiment.

Figure 8:
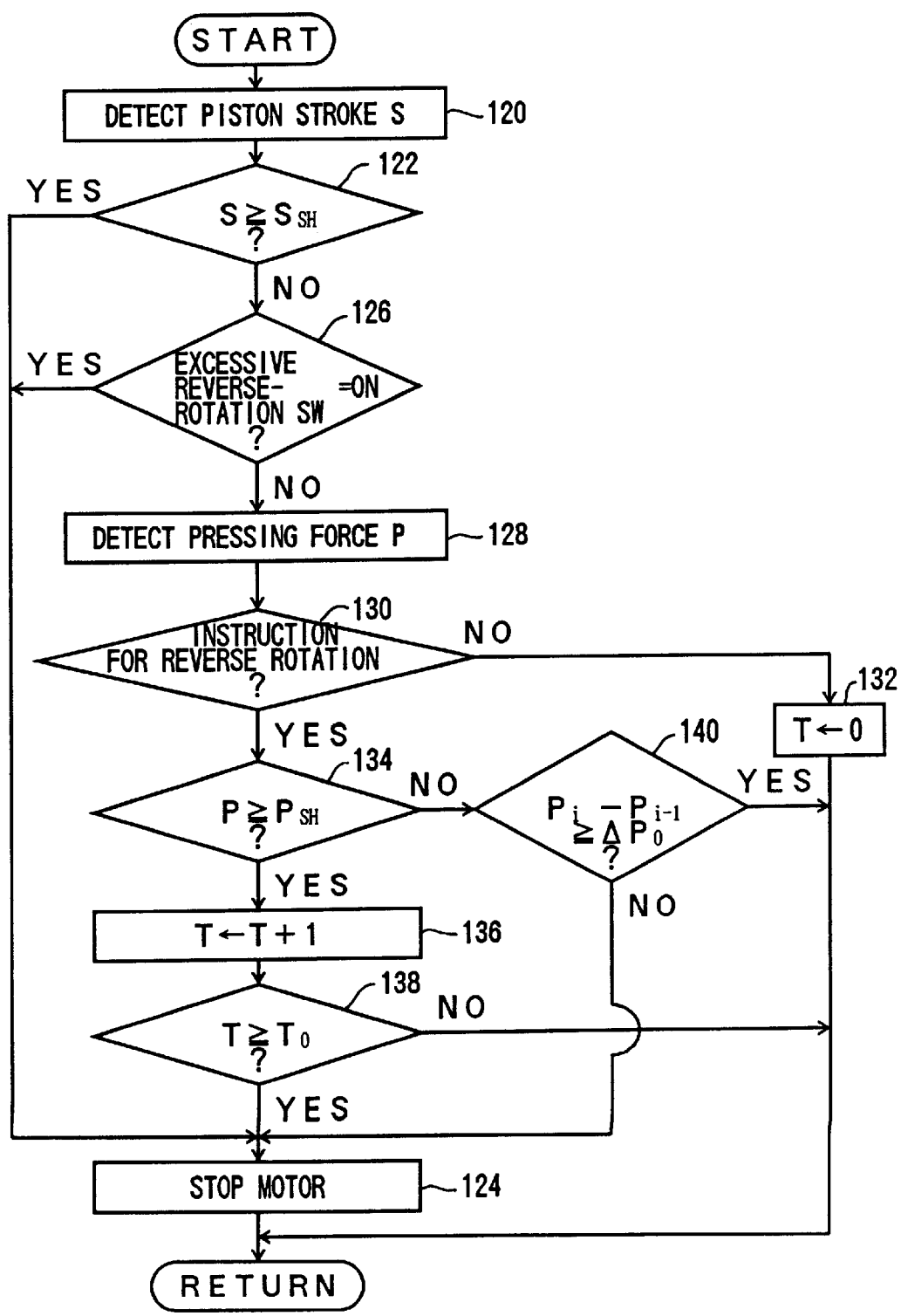
FIG. 8 is a flowchart of a control routine performed by the electric brake apparatus according to the third embodiment of the present invention.

FIG. 8 is a flowchart of a control routine performed by the ECU 10 provided in the electric brake apparatus according to the present embodiment so as to achieve the above-mentioned feature. The routine shown in FIG. 6 is repeatedly performed each time the routine is ended. When the routine shown in FIG. 8 is started, the process of step 120 is performed first.

In step 120, a piston stroke S or a travel of the output rod 60 is detected from a rotational angle θ of the motor shaft 48 of the brake motor 30 which rotational angle is detected based on the output signal of the rotation sensor 21.

In step 122, it is determined whether or not the piston stroke S is equal to or greater than a predetermined value $S_{SH}$. It should be noted that the predetermined value $S_{SH}$ is a minimum value of the piston stroke S or travel by which it can be determined that the brake motor 30 is excessively rotated in the reverse direction. If $S \geq S_{SH}$ is established, it can be determined that the brake motor 30 is excessively rotated in the reverse direction. Accordingly, when such a determination is made, the process of step 124 is performed next.

In step 124, a process for stopping an operation of the brake motor 30 is performed. Specifically, a process for stopping a supply of the motor current to the brake motor 30 is performed. After the process of the step 124 is performed, the operation of the brake motor 30 is stopped, which prevents the brake motor from being excessively rotated in the reverse direction.

If the above-mentioned relationship $S \geq S_{SH}$ is not established in step 122, the brake motor 30 may be excessively rotated in the reverse direction due to malfunctioning of the rotation sensor 21. Thus, if it is determined, in step 122, that $S \geq S_{SH}$ is not established, the process of step 126 is performed next.

In step 126, it is determined whether or not the excessive reverse-rotation switch 96 is in the on state. If the excessive reverse-rotation switch 96 is in the on state, it can be determined that the output rod 60 is excessively moved in a direction opposite to the pressing member 62. As a result, it can be determined that the brake motor 30 is excessively rotated in the reverse direction. Accordingly, if it is determined that the excessive reverse-rotation switch 96 is in the on state, the process of step 124 is performed next, and, thereby, the operation of the brake motor 30 is stopped.

On the other hand, if the excessive reverse-rotation switch 96 is not in the on state, there may be a case in which the excessive reverse-rotation switch 96 maintains the off state despite the brake motor 30 being excessively rotated in the reverse direction due to a malfunction of the excessive reverse-rotation switch 96. Accordingly, if it is determined, in step 126, that the excessive reverse-rotation switch 96 is not in the on state, the process of step 128 is performed next.

In step 128, the pressing force P is detected based on the output signal of the pressing force sensor 98.

In step 130, it is determined whether or not an instruction for reverse rotation is provided to the brake motor 30 so as to cancel generation of a brake force. If the instruction for reverse rotation is not provided, it can be determined that the brake motor 30 is rotated in the normal direction or is prohibited from being rotated. Accordingly, in such a case, the brake motor 30 does not rotate in the reverse direction. Thus, when the instruction for reverse rotation is not provided to the brake motor 30, the process of step 132 is performed next.

In step 132, a process for resetting an accumulating timer T to "0" is performed. The accumulating timer T is a timer for counting a continuous time during which the condition of the step 130 and the condition of step 134 described later are established. When the process of step 132 is ended, the routine at this time is ended. When the instruction for reverse rotation is provided to the brake motor 30 for more than a predetermined time period under a condition in which the output rod 60 is separated from the pressing member 62 due to the instruction for reverse rotation being provided to the brake motor 30, the operation of the brake motor 30 is stopped. Accordingly, if it is determined, in step 130, that the instruction for reverse rotation is provided to the brake motor 30, the process of step 134 is performed next.

In step 134, it is determined whether or not the pressing force P detected in the above-mentioned step 128 is equal to or smaller than a predetermined value $P_{SH}$. It should be noted that the predetermined value $P_{SH}$ is a minimum value of the pressing force by which it can be determined that the output rod 60 is separated from the pressing member 62. Accordingly, if $P \leq P_{SH}$ is established, it can be determined that the output rod 62 is separated from the pressing member 62.

In step 136, a process for incrementing the accumulating timer T is performed. According to the above-mentioned process, a time period after the conditions of steps 130 and 134 are established is counted by the accumulating timer T.

In step 138, it is determined whether or not the count value of the accumulating timer T reaches a predetermined value T0. It should be noted that the predetermined value T0 is a time period required for the output rod 60 to move to a position at which the brake pads 66 and 67 are not subjected to uneven abrasion after the output rod 60 begins to move apart from the pressing member 62 at a minimum speed generated when the instruction for reverse rotation is provided to the brake motor 30. As a result, if it is determined that $T \geq T0$ is not established, the routine at this time is ended. On the other hand, if it is determined that $T \geq T0$ is established, the process of step 124 is performed next, and, thereby, the operation of the brake motor 30 is stopped.

If the relationship $P \leq P_{SH}$ is not established, it can be determined that a large pressing force P is generated between the output rod 60 and the pressing member 62. Additionally, when the pressing force P is not changed despite the instruction for reverse rotation being provided to the brake motor 30, it can be determined that a malfunction occurs in the brake motor 30. In such a case, it is appropriated to stop the operation of the brake motor 30. Accordingly, if it is determined, in step 134, that $P \leq P_{SH}$ is not established, the process of step 140 is performed next.

In step 140, it is determined whether or not a difference between a pressing force Pi which is detected in the present process cycle and a pressing force Pi−1 which is detected by the previous process cycle is equal to or greater than a predetermined pressure change ΔP0. If it is determined that Pi−(Pi−1)≥ΔP0 is established, it can be determined that the pressing force is changed with respect to the instruction for reverse rotation provided to the brake motor 30. Accordingly, if it is determined that Pi−(Pi−1) is not established, the process of step 124 is performed next, and, thereby, the operation of the brake motor 30 is stopped.

According to the above-mentioned process, the operation of the brake motor 30 can be stopped when it is determined that the output rod 60 is excessively moved in the leftward direction in FIG. 2; when the excessive reverse-rotation switch 96 detects the output rod 60; or when the instruction for reverse rotation provided to the brake motor 30 is not canceled for a predetermined time period even if the pressing force generated between the output rod 60 and the pressing member 62 is small. Thus, according to the electric brake apparatus of the present embodiment, the brake motor 30 is positively prevented from being excessively rotated in the reverse direction even when a malfunction occurs in one of various sensors and switches. Thus, according to the electric brake apparatus of the present embodiment, the brake motor 30 can be prevented from being excessively rotated in the reverse direction without a complex mechanical structure. Thereby, an attempt can be made to improve reliability of the electric brake apparatus.

It should be noted that, in the above-mentioned embodiment, the brake motor 30 is positively prevented from being excessively rotated in the reverse direction by the rotation sensor 21, the excessive reverse-rotation sensor 96 and the pressing force sensor 98 being added to the apparatus according to the first embodiment. However, the present invention is not limited to such a structure, and each of the rotation sensor 21, the excessive reverse-rotation sensor 96 and the pressing force sensor 98 may be independently used or applied to the above-mentioned second embodiment.

Additionally, in the above-mentioned embodiments, the operation of the brake motor 30 is stopped for the reason that the brake motor 30 is malfunctioning when the pressing force P generated between the output rod 60 and the pressing member 62 is not changed under the condition in which the instruction for reverse rotation is provided to the brake motor 30. However, the operation of the brake motor 30 may be stopped for the reason that the brake motor 30 is malfunctioning when the rotational angle θ of the motor shaft 48 of the brake motor 30 or the piston stroke S of the output rod 60 is not changed.

The present invention is not limited to the specifically disclosed embodiments, and variations and modifications may be made without departing from the scope of the present invention.

The present application is based on Japanese priority applications No.10-235930 filed on Aug. 21, 1998 and No.11-013420 filed on Jan. 21, 1999, entire contents of which are hereby incorporated by reference.

What is claimed is:

1. An electric brake apparatus for generating a braking force by driving a brake motor in a predetermined direction, the braking force being canceled by driving the brake motor in a reverse direction opposite to the predetermined direction, said electric brake apparatus comprising:

excessive rotation determining means for determining whether or not said brake motor is excessively driven in the reverse direction; and motor stopping means for stopping an operation of said brake motor when said brake motor is determined to be excessively driven in the reverse direction.

2. The electric brake apparatus as claimed in claim 1, wherein said excessive rotation determining means includes a rotation sensor detecting a rotational angle of a rotational shaft of said brake motor so that said excessive rotation determining means determines that said brake motor is excessively rotated when said rotational shaft is rotated beyond a predetermined angle in the reverse direction.

3. The electric brake apparatus as claimed in claim 1, wherein said motor stopping means includes a fuse which blows when a current exceeding a predetermined current flows to said brake motor in a direction in which said brake motor is driven in the reverse direction.

4. The electric brake apparatus as claimed in claim 1, wherein said excessive rotation determining means includes a current detecting circuit detecting a current flowing to said brake motor in a direction in which said brake motor is driven in the reverse direction, and said motor stopping means stops the operation of said brake motor when the current detected by said current detecting circuit exceeds a predetermined value.

5. The electric brake apparatus as claimed in claim 1, further comprising a reciprocal member reciprocally movable by operation of said brake motor so as to press a brake pad against a brake disc rotating with a wheel, wherein said excessive rotation determining means calculates a travel of said reciprocal member based on a rotational angle of a rotational shaft of said brake motor so that said excessive rotation determining means determines that said brake motor is excessively rotated when said reciprocal member travels beyond a predetermined position in a direction in which said brake motor is driven in the reverse direction.

6. The electric brake apparatus as claimed in claim 5, further comprising an excessive reverse-rotation switch which turns on when said reciprocal member reaches the predetermined position, wherein said motor stopping means stops the operation of said brake motor when said excessive reverse-rotation switch is turned on.

7. The electric brake apparatus as claimed in claim 6, further comprising means for determining whether or not said brake motor is driven in the reverse direction for a continuous period longer than a predetermined period after the brake pad is separated from the brake disc, wherein said motor stopping means stops the operation of said brake motor when said brake motor is driven in the reverse direction for the continuous period longer than the predetermined period.

* * * * *